United States Patent [19]

Schuricht

[11] 4,254,861
[45] Mar. 10, 1981

[54] CONVEYING DEVICE WITH OBJECT HOLDING STATIONS

[75] Inventor: Henry A. Schuricht, Pontiac, Mich.

[73] Assignee: AMSTED Industries Incorporated, Chicago, Ill.

[21] Appl. No.: 75,606

[22] Filed: Sep. 14, 1979

[51] Int. Cl.³ .............................................. B65G 25/02
[52] U.S. Cl. .......................................... 198/774; 74/86
[58] Field of Search ....................... 198/488, 773, 774; 74/26, 86

[56] References Cited

U.S. PATENT DOCUMENTS

| 2,479,709 | 8/1949 | Arnold | 198/774 |
| 3,154,191 | 10/1964 | Schmidt | 198/774 |
| 3,187,883 | 6/1965 | Umbricht | 198/774 |

FOREIGN PATENT DOCUMENTS 524746 10/1976 U.S.S.R. .................................. 198/773

Primary Examiner—Jeffrey V. Nase
Attorney, Agent, or Firm—John L. Schmitt; Fred P. Kostka; Edward J. Brosius

[57] ABSTRACT

An elongated conveying device suitable for connecting spaced work stations, for example, receives a flow of objects such as component parts at an appropriate entrance. The objects are placed on a pair of spaced stationary rails from which the objects are lifted, carried forward and then returned to the stationary rails by a pair of movable rails which is rotated in a circular-shaped cycle. With each cycle of the movable rails, the objects are stepped from the entrance to an exit located some distance away. Because the rate of object input may vary from the rate of part discharge, the conveying device may include holding stations adjacent to the exit allowing the objects to accumulate in a damage resistant manner until removed from the conveying device.

1 Claim, 19 Drawing Figures

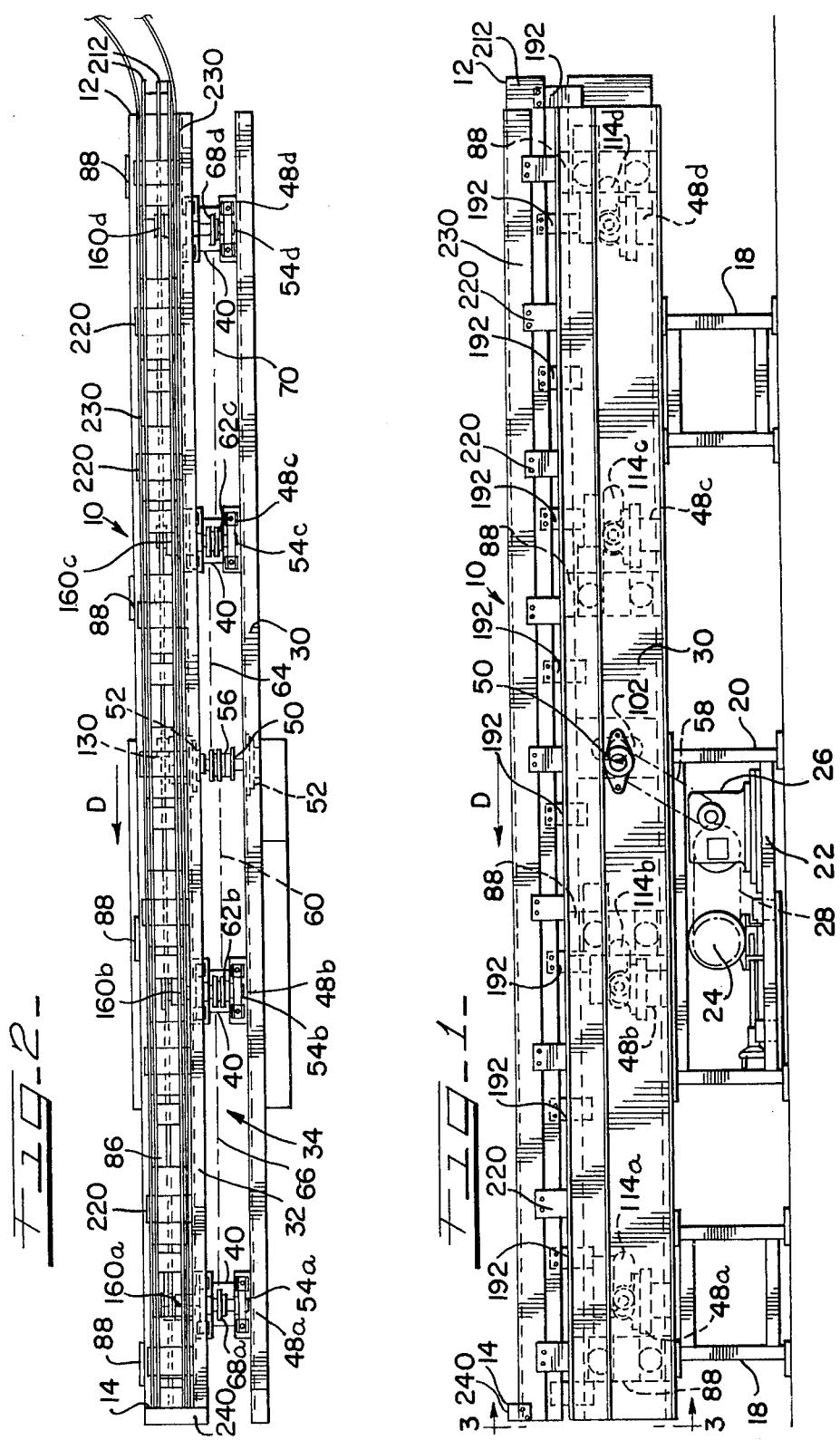

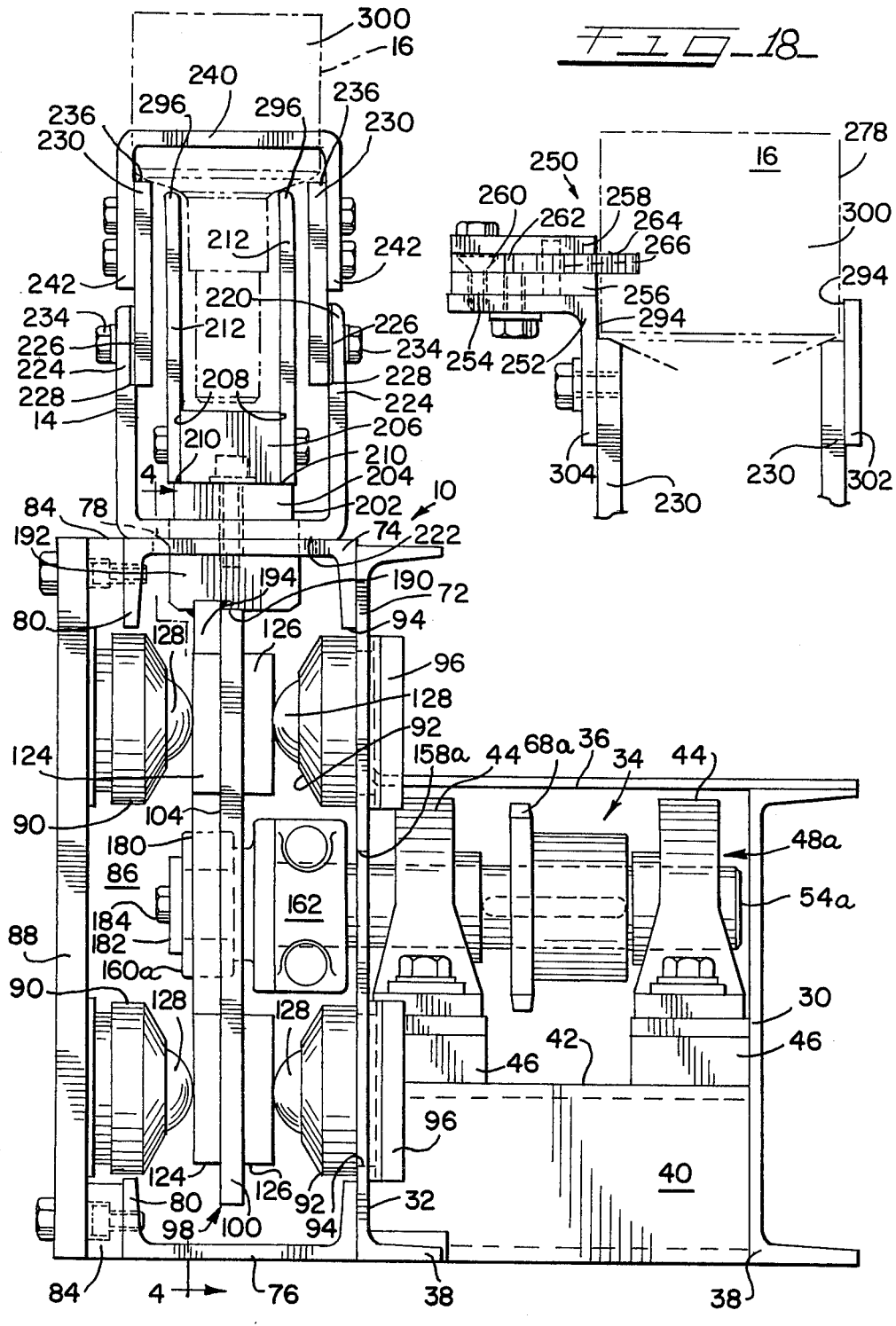

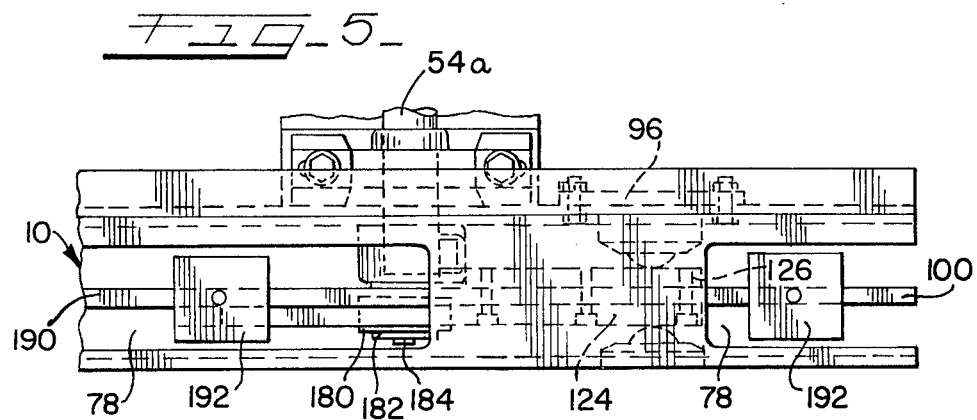
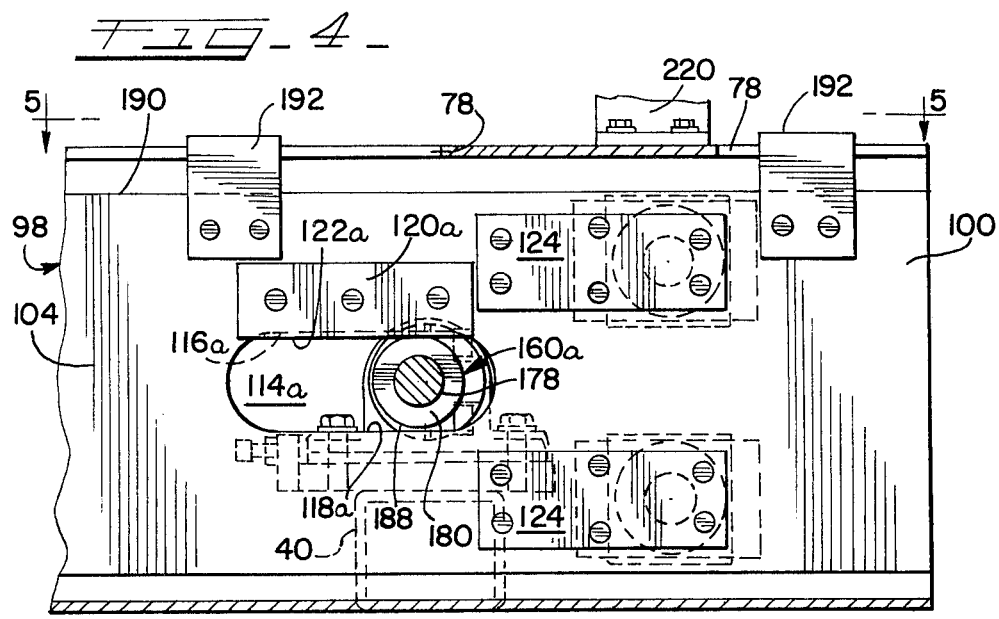

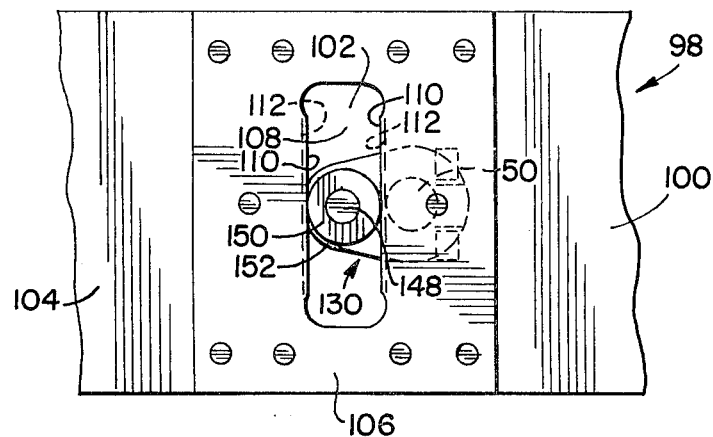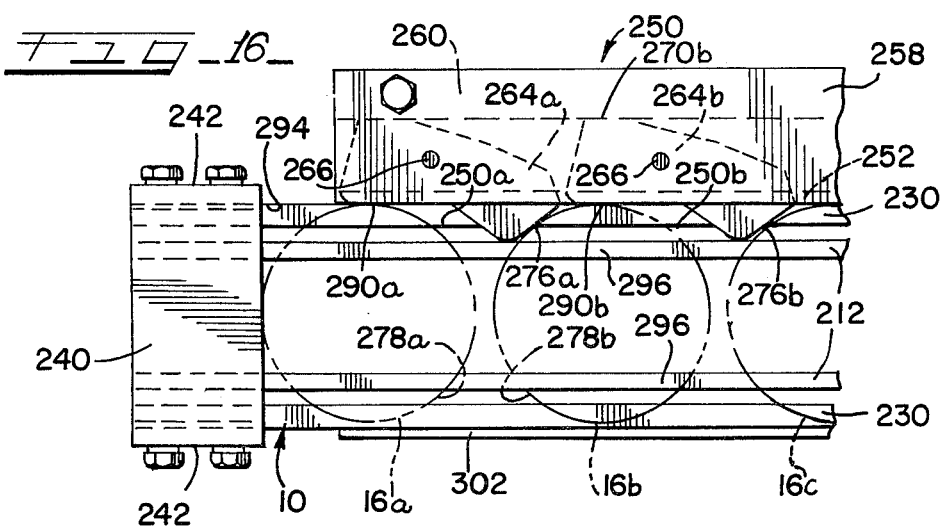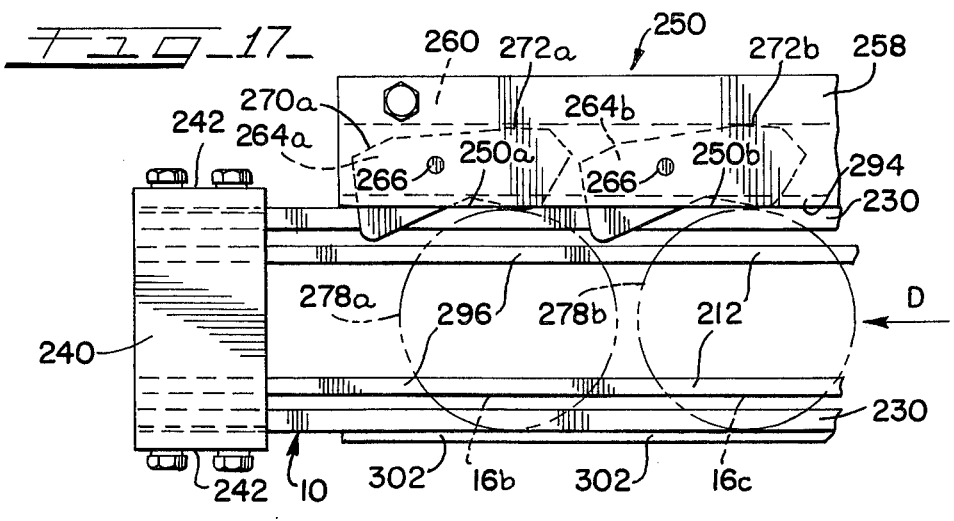

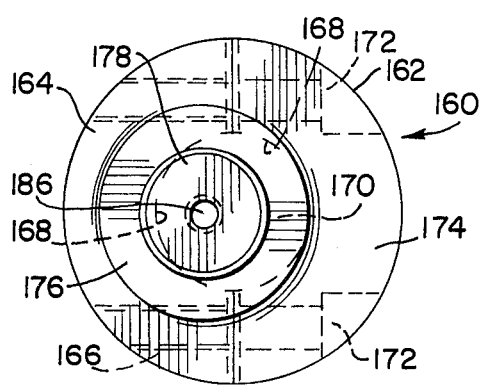
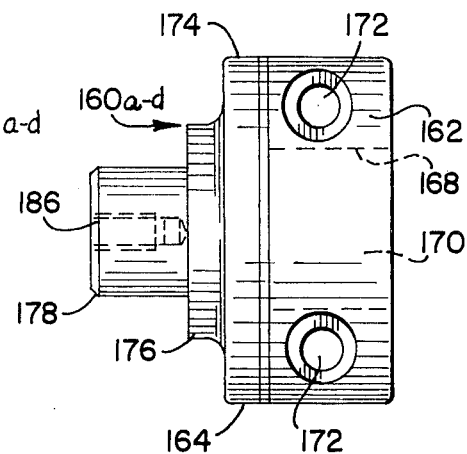
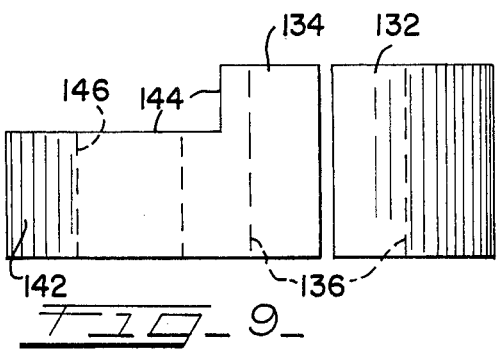
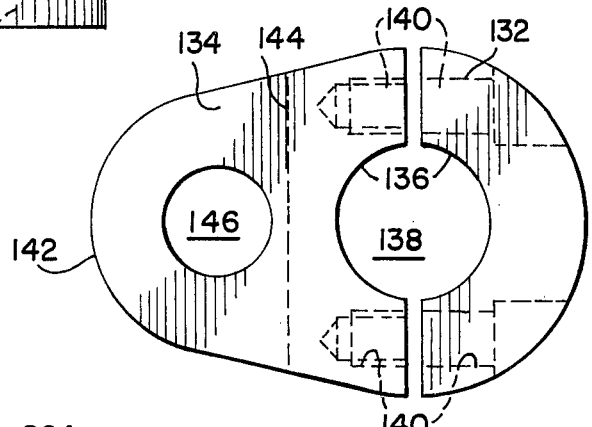
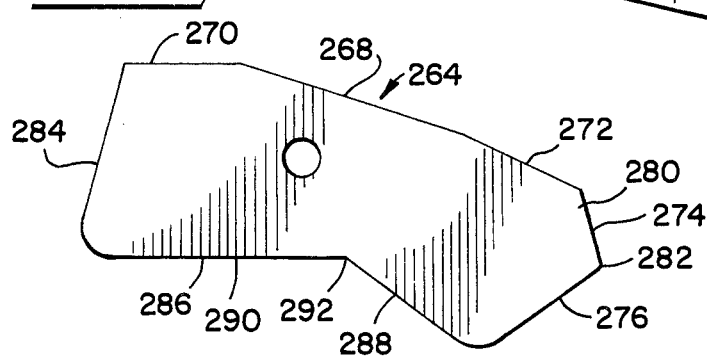

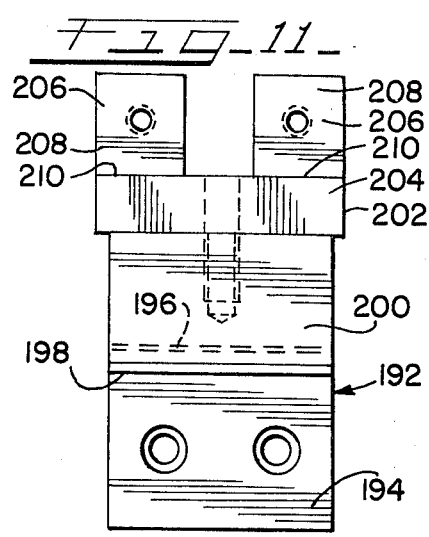
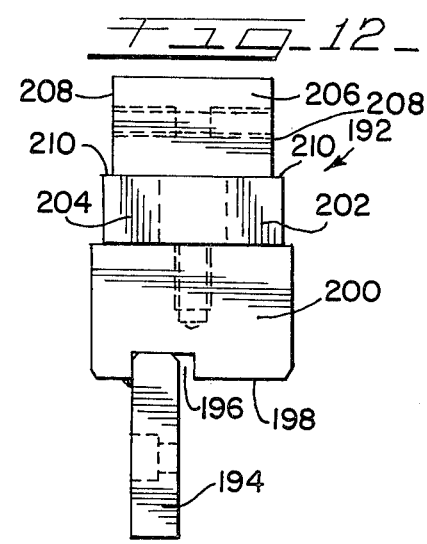
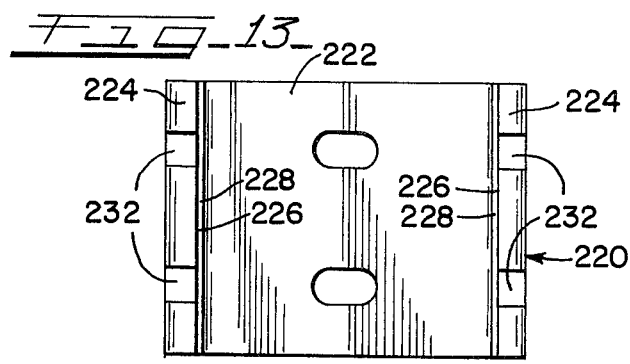
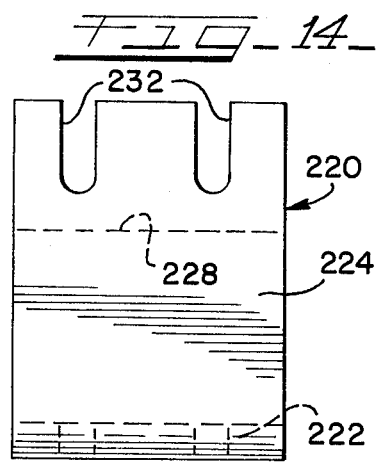
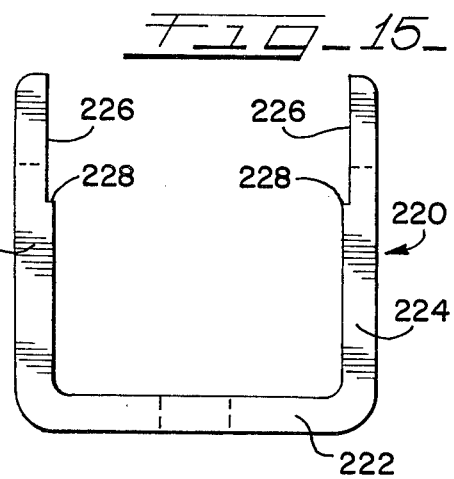

CONVEYING DEVICE WITH OBJECT HOLDING STATIONS

BACKGROUND OF THE INVENTION

1. Field of Invention

This invention relates to conveying devices and more particularly to conveying devices adapted to receive objects in an in-file orientation for movement to an exit where the objects may accumulate.

2. Prior Art

Conveying devices for movement of objects between two spaced locations are well known. A belt conveyor in use for many years is an example of such.

Because of the configuration of the object to be conveyed and the susceptibility of the objects to sustain damage, specialized conveying devices have been developed. Such specialized devices not only provide movement of the objects but also accumulation and storage of the objects. These latter functions are important where the conveying device connects work stations in a modern manufacturing environment since the output of one work station may vary substantially over a short time period from the input to a further work station. Thus, storage of the objects between stations is required to promote efficient operation.

Applicant herein has provided a number of specialized conveying devices as disclosed, for example, in U.S. Pat. Nos. 3,613,869 and 4,155,443 and in recently filed applications U.S. Ser. Nos. 903,951 and 032,548.

SUMMARY OF THE INVENTION

Objects, for example a component part of an automotive transmission assembly, are received in a file orientation at an entrance to the conveying device of this invention. The entrance may be connected, for example, to an output of a first work station with the conveying device providing movement of the objects to a second work station.

Because of the configuration of the part, the parts may be conveniently supported by a pair of spaced stationary rails. A pair of movable rails, interposed between the stationary rails, is operatively connected to a reciprocating drive which moves the movable rails in a vertical circular-like cycle. During each cycle, the movable rails engage the objects to lift the objects from the stationary rails, carry such forward and then lower the objects so that they again rest on the stationary rails. With each cycle of the movable rails, the objects are stepped from the entrance to an exit of the conveying device located adjacent to the second work station, for example.

Because the two work stations may operate at different rates, particularly over a short time period, the conveying device may include a series of holding stations where the objects accumulate adjacent to a stop and are stored in a damage resistant environment. The holding stations include a series of rockable holding cams which engage the objects to maintain separation therebetween as well as object orientation. As objects are removed from the holding stations, upstream objects move forward to fill the now empty holding stations.

The conveying device of this invention offers several advantages over known conveyors.

First, the reciprocating means of this conveying device offers superior reliability. Additionally, all movable parts of this conveying device are readily accessible to allow easy maintenance and replacement of worn parts if required.

Secondly, the holding stations allow the conveying device to continue to operate as objects accumulate adjacent to the exit. By storing the objects in individual holding stations, the objects remain physically separated. The holding stations prevent object-to-object contact and thus reduce substantially the probability of damage resulting from such contact. Additionally, the holding stations insure that the orientation of the objects remains unaltered.

DESCRIPTION OF THE DRAWINGS

FIG. 1 is a side elevational view of the conveyor of this invention.

FIG. 2 is a plan view of the conveyor of FIG. 1.

FIG. 3 is an elevational view of an exit end of the conveyor as seen generally along the line 3—3 in FIG. 1.

FIG. 4 is a cross-sectional view of a partial section of the conveyor as seen generally along the line 4—4 of FIG. 3 depicting a portion of a reciprocation means producing a vertical portion of the reciprocating cycle.

FIG. 5 is a plan view of the partical section of the conveyor as seen generally along the line 5—5 in FIG. 4.

FIG. 6 is an elevational view of a partial section of the conveyor of FIG. 1 depicting a portion of the reciprocation means producing a horizontal portion of the reciprocation cycle.

FIG. 7 is a detailed front elevational view of a cam portion of the reciprocation means of FIG. 4.

FIG. 8 is a side elevational view of the cam portion of FIG. 7.

FIG. 9 is a detailed plan view of a further cam portion of the reciprocation means of FIG. 6.

FIG. 10 is a side elevational view of the cam portion of FIG. 9.

FIG. 11 is a detailed front elevational view of a carrier bracket forming part of the conveyor of FIG. 1.

FIG. 12 is a side elevational view of the carrier bracket of FIG. 11.

FIG. 13 is a detailed plan view of a stationary rail bracket forming part of the conveyor of FIG. 1.

FIG. 14 is a front elevational view of the bracket of FIG. 13.

FIG. 15 is a side elevational view of the bracket of FIG. 13.

FIG. 16 is a plan view of the exit end of the conveyor of FIG. 1 wherein the conveyor may include a series of holding stations filled with objects.

FIG. 17 is a further plan view of the holding stations of FIG. 16 wherein the object adjacent to a stop has been removed.

FIG. 18 is an end elevational view of the holding stations of FIG. 16.

FIG. 19 is a detailed plan view of a holding cam forming part of the holding stations of FIG. 16.

DESCRIPTION OF THE PREFERRED EMBODIMENT

The conveyor of this invention is shown typically in FIGS. 1 and 2 and designated 10. It should be understood that the conveyor 10 may be made in an infinite number of lengths between an entrance end 12 and an exit or opposite end 14. The conveyor 10 provides means for moving objects 16 therebetween in the direction noted by the arrow D in FIGS. 1 and 2. The conveyor 10 may include ascending and descending sections so that the objects 16 may be raised or lowered to different elevations.

The conveyor 10 includes a series of spaced stands 18. The number of stands 18 utilized will vary with the length of the conveyor 10. One stand will be a drive unit stand 20 having a lower plate 22 for mounting an electric motor 24. The motor 24 is operatively connected to a speed reducer unit 26 by a chain drive 28. It should be understood that the motor 24 and the reducer unit 26 may be alternatively connected through a flexible coupler if so desired.

The conveyor 10 is further defined by an outer channel member 30 which rests on the support stands 18. The outer channel member 30 and an inner channel member 32 spaced therefrom form sidewalls of power distributor plenum 34 further defined by a removable top plate 36 which covers the plenum 34. In FIG. 1 the top plate 34 is purposely not shown. Selectively spaced between a bottom edge 38 of the inner and outer channel members 30, 32 are tube supports 40 each having a rectangular configuration. As seen in FIG. 3, a flat top surface 42 of each tube support 40 forms a supportive base for spaced bearing pillow blocks 44 each of which is separated from the tube top surface 42 by a spacer 46.

As best understood by again viewing FIGS. 1 and 2, there are four such tube support bearing block assemblies 48 which are designated 48a, 48b, 48c and 48d. Assemblies 48a,b are located and equi-spaced on one side of a primary drive shaft 50 while the assemblies 48c,d are similarly located on an opposite side. The shaft 50 is journaled in a pair of spaced bearings 52 carried by the outer and inner channel members 30, 32. Journaled in the bearing block assemblies 48a-d are secondary drive shafts 54a, b, c and d, respectively.

Keyed to the primary drive shaft 50 is a triple chain sprocket 56. A first sprocket portion of the triple sprocket 56 is operatively connected to an output of the speed reducer 26 by a primary drive chain 58. A second sprocket portion of the triple sprocket 56 is operatively connected to the secondary drive shaft 54b by a chain loop 60 which also engages a first portion of a double chain sprocket 62b keyed to the secondary shaft 54b. A third sprocket portion of the triple sprocket 56 in turn is operatively connected to the secondary drive shaft 54c by a chain loop 64 which engages a first portion of a double chain sprocket 62c keyed to the secondary shaft 54c.

The outer secondary drive shaft 54a is operatively connected to the secondary drive shaft 54b by a further chain loop 66 which is carried by a second portion of the double chain sprocket 62b and a single chain sprocket 68a keyed to the outer secondary drive shaft 54a. In a like manner, the outer secondary drive shaft 54d is operatively connected to the secondary drive shaft 54c by a chain loop 70 carried by a second portion of the double chain sprocket 62c and a single chain sprocket 68d keyed to the secondary shaft 54d.

As best understood by viewing FIG. 3, attached to a vertical web portion 72 of the inner channel member 32 is a top and bottom channel cover 74, 76. The bottom channel cover 76 forms a continuous closure between the entrance 12 and the exit 14 of the conveyor 10. The top channel cover 74 also runs between the entrance 12 and the exit 14 but includes a series of spaced elongated apertures 78 which may be readily seen in FIGS. 4 and 5.

Periodically spaced along outer flanges 80 of the top and bottom channel covers 74, 76 are spacers 84 to which are fastened a series of vertical supports 88. Each support 88 in turn carries a pair of vertically spaced outer ball transfers 90. Each such pair 90 is positioned opposite an opposing pair of vertically spaced inner ball transfers 92. Each pair of ball transfers 92 extends through a pair of spaced apertures 94 formed in the vertical web 72 of the inner channel member 32. Each inner ball transfer 92 is fastened to a plate 96 which in turn is affixed to the vertical web 72 of the inner channel member 30.

Note that by providing the vertical supports 88 and the support plates 96 which in turn are fastened to the main structural member of the conveyor 10, the ball transfers 90, 92 remain readily accessible for maintenance and replacement if so required. Additionally, carried between the vertical supports 88 are sheet metal cover plates (not shown) which enclose a drive plenum 86 further including the inner channel members 32 and the top and bottom channel covers 74, 76.

Carried between the opposing pairs of ball transfers 90, 92 is a vertically oriented drive plate assembly 98 which extends from the entrance 12 to the exit 14 of the conveyor 10. The drive plate assembly 98 includes a drive plate 100 which is formed having a centrally located vertically oriented elongated opening 102 as best seen in FIG. 6. The opening 102 is proximately aligned with the primary input shaft 50. Attached to an outer vertical face 104 of the drive plate 100 is a horizontal reciprocating wear plate 106 having an opening 108 therein defined by vertical sidewalls 110 spaced apart a selective distance which is less than a distance between sidewalls 112 of the drive plate opening 102.

The drive plate assembly 98 further includes a series of horizontally oriented elongated openings 114 which are designated 114a-d. Each opening 114a-d is proximately aligned with the secondary drive shafts 54a-d respectively. Seen in FIG. 4 is the opening 114a which is typical of the remainder. Each opening 114 is defined in part by a horizontal top and bottom wall 116, 118 and as shown in FIG. 4 are designated 116a, 118a. Attached to the outer face 104 of the drive plate 100 and above each opening 114 is vertical reciprocating wear plate 120 with the plate in FIG. 4 designated 120a. A bottom edge 122 of each wear plate 120 is positioned slightly below the top wall 116 of each opening 114 and as seen in FIG. 4 is designated 122a.

The drive plate assembly 98 further comprises pairs of outer and inner ball transfer wear plates 124, 126. These wear plates 124, 126 are fastened to the drive plate 100 and are positioned to interact with a ball portion 128 of each of the inner and outer pairs of ball transfers 90, 92 so as to maintain the vertical orientation of the drive plate assembly 98 while allowing selective vertical movement of such.

An inner end of the primary drive shaft 50 extends through an opening (not shown) in the web portion 72 of the inner channel member 32 and carries a horizontal reciprocating cam assembly 130. As shown in FIGS. 6, 9 and 10, the cam assembly 130 includes a clamping portion 132 and a holding portion 134 each having a semi-circular cutout 136. The cutouts 136 mate to form a circular opening 138 to receive the drive shaft 50 and be adjustably affixed thereto by bolts (not shown) secured in bolt openings 140 formed in the clamping and holding portions 132, 134 respectively. An outer end 142 of the holding portion 134 is formed with an offset 144 and has a shaft opening 146. As seen in FIG. 6, a shaft 148 is disposed in the opening 146 and a bearing 150 is carried thereon. An outer race 152 of the bearing 150 engages with the sidewalls 110 of the opening 108 in the wear plate 106. The horizontal reciprocating cam assembly 130 provides proximately 1.75 inches of eccentricity to produce a total cycle amplitude of 3.25 inches in the horizontal plane.

In a like manner, an inner end of each of the four secondary drive shafts 54a-d extends through an opening in the web 72 of the inner channel member 32. As seen in FIG. 3, the shaft 54a extends through an opening 158a. Each shaft 54a-d carries a vertical reciprocation cam assembly 160a-d respectively. A portion of the cam assembly 160 is shown in FIGS. 7 and 8 and is typical of the remainder.

Each cam assembly 160a-d includes a semi-circular shaped clamping portion 162 and a holding portion 164. The holding portion 164 includes a semi-circular shaped boss 166 having a semi-circular cutout 168 therein. The clamping portion 162 has a like semi-circular cutout 168 which with the boss cutout 168 mates to form an opening 170 to receive the shafts 54a-d respectively. By means of bolts (not shown) inserted in bolt holes 172, the cams 160a-d may be adjustably affixed to the shaft 54a-d.

Each holding portion 164 further includes an annular flange 174 on which is formed an eccentrically offset shoulder 176. Projecting outwardly from the shoulder 176 is a bearing shaft 178. On the bearing shaft 178 is a vertical cam bearing 180 which is secured to such by a washer 182 and a bolt 184 threadedly assembled in a bolt hole 186.

An outer race 188 of the cam bearing 180 of each vertical cam assembly 160a-d engages with the bottom edge 122a-d of the wear plates 120a-d respectively as seen typically in FIG. 4. Each vertical reciprocating cam assembly 160a-d provides a ¼ inch eccentricity to produce movement in a vertical plane proximating ½ inch.

Periodically spaced along a top edge 190 of the drive plate 100 are a series of carrier brackets 192. The carrier brackets 192 are so positioned along the drive plate assembly top edge 190 to extend upwardly through the spaced apertures 78 in the top channel cover 74.

As is best understood by viewing FIGS. 11 and 12, each bracket 192 comprises an attaching plate 194 carried in an offset groove 196 formed in a bottom 198 of a lower support block 200. The attaching plate 194 is offset such that when fastened to the outer surface 104 of the drive plate 100, a center line of the lower support block 200 is aligned with a center line of the drive plate 100.

Threadedly attached to a top of the lower support block 200 of the carrier bracket 192 is an upper support block 202. The upper block 202 comprises a base portion 204 which carries two spaced posts 206. Sidewalls 208 of each post 206 are inwardly offset from the base to provide a step 210. Threadedly attached to sidewalls 208 of the posts 206 of each upper support block 202 is a pair of movable support rails 212 which rests on the steps 210 respectively.

Spaced between each aperture 78 in the top channel cover 74 are a series of stationary rail brackets 220. The bracket 220 is shown in some detail in FIGS. 13-15 and includes a flat bottom portion 222 which rests on the top channel cover 74. Extending upwardly from the bottom 222 are spaced arms 224. Each arm 224 has an upper inner recess portion 226 forming an offset 228 which supports a pair of stationary support rails 230. In each bracket arm 224 is a pair of slots 232. These slots 232 receive bolts 234 which are threadedly fastened to the stationary rails 230 and allow a top edge 236 of each rail 230 to be adjusted vertically as may be required.

The exit end 14 of the conveyor 10 may include a stop 240. The stop 240 has an inverted U-shaped configuration as seen in FIG. 3 having spaced legs 242 which may be readily bolted to the stationary rails 230.

Depending on the configuration of the objects 16 to be transferred by the conveyor 10, a series of holding stations 250 may be provided to maintain the objects 16 in a spaced relationship and insure a vertical orientation of such as the objects 16 accumulate upstream from the stop 240.

As seen in FIGS. 16 and 17, two such holding stations 250a,b are shown. The holding stations 250 include an elongated support angle 252 which may be conveniently bolted to one of the stationaty rails 230. A horizontal leg 254 of the angle 252 forms a support for a lower bearing plate 256 spaced from an upper bearing plate 258 by a stop plate 260. The stop plate 260 has a lesser width dimension than the lower and upper bearing plates 256, 258 to provide a receiving space 262 for a series of holding cams 264. As seen in FIGS. 16 and 17, there are two such cams 264a, 264b. Each cam 264 is pivotally carried between the bearing plates 256, 258 by a pin 266.

As seen in FIG. 19, each cam 264 has a lazy-L like configuration defined by an outer sidewall 268 having a forward stop portion 270 for engagement with the stop plate 260 when the cam 264 rotates clockwise and rear stop portion 272 for engagement with the stop plate 260 when the cam 264 rotates counterclockwise.

Each holding cam 264 is further defined by a rear end wall 274 divided into an inner portion 276 which lies tangential to and may contact a portion of an outer surface 278 of the object 16 when the holding cam 264 has rotated clockwise so that the outer sidewall forward stop portion 270 is engaged with the stop plate 260. The rear end wall 274 further includes an outer portion 280 which is angularly offset to intersect the inner portion 276 at a point 282 such that the rear end wall 274 is free from engagement with a forward end wall 284 of an adjacent holding cam. As shown, cams 264a and 264b are independent of each other.

Each holding cam 264 is lastly defined by an inner sidewall 286 comprising a rear portion 288 which lies fully to the rear of the pivot pin 266 and is so positioned to lie outside of the path of movement of the objects 16 when the holding cam 264 is rotated counterclockwise so that the rear stop portion 272 of the outer sidewall 268 is engaged with the stop plate 260. The inner sidewall rear portion 288 converges inwardly to intersect with a forward portion 290 at a point 292 located to the rear of the pivot pin 266. The inner sidewall forward portion 290 diverges outwardly from the point 292 to form an obtuse angle with the rear inner sidewall portion 288 and lies proximately parallel to the outer sidewall forward stop portion 270.

When the holding cam 264 is rotated fully clockwise, the inner sidewall forward portion 290 lies proximately aligned with a side 294 of the path of movement of the objects 16. When the holding cam 264 is rotated fully counterclockwise, the forward inner sidewall portion 290 extends into the path of movement on an angle of proximately 20 degrees with such.

The conveyor 10 has been used successfully in automotive assembly manufacture wherein the objects 16 form part of an automatic transmission. The objects 16, in this case, have an upper cup portion 300 which is automatically filled with grease at a work station connecting with the entrance 12 of the conveyor 10.

Assuming that rotational output of the motor 24 is proximately 1750 rpm and the speed reducer 26 has an input-output ratio of 50:1, the primary chain drive 58 rotates the primary input shaft 50 at proximately 35 rpm.

Prior to actuation of the conveyor 10, the horizontal reciprocating cam assembly 130 and the vertical reciprocating cam assemblies 160 are eccentrically aligned such that, for example, the outermost point of eccentricity of each is aligned with a line passing through a center of the primary input shaft 50 and the secondary shafts 54a-d.

Because of the various chain and sprocket connections between the primary input shaft 50 and the secondary shaft 54a-d, as was discussed earlier, the drive plate assembly 98 is driven in a counterclockwise eliptical cycle as would be seen in FIG. 1. A horizontal portion of the cycle is produced by the outer race 152 of cam bearing 150 of the horizontal cam assembly 130 engaging the sidewalls 110 of the wear plate opening 108. A vertical portion of the cycle is produced by the outer race 188 of each cam bearing 180 of the vertical cam assemblies 160a-d engaging the bottom edges 122a-d of the wear platea 120a-d, respectively. Note that the cam bearings 150 and 180 are so positioned within the respective openings 108 and 114 that there is no engagement with end walls of the openings 108, 114 during the rotation of the cam assemblies 130, 160a-d.

During rotation of the drive plate assembly 98, the drive plate assembly 98 is maintained in a vertical orientation by the outer and inner pairs of ball transfers 90, 92 wherein the ball portions 128 of such engage the wear plates 124, 126 respectively.

The position of each top edge 296 of each movable support rails 212 is such that during one half of the reciprocation cycle, the top edges 296 move above the top edges 236 of the stationary support rails 230. During the other half of the cycle, the top edges 296 are below the stationary rail top edges 236. Likewise, while the movable support rail top edges 296 are above the stationary rail top edges 236, the drive plate assembly 98 is in a forward portion of its cycle. Conversely, during a rearward portion of the cycle, the movable rail top edges 296 are below the stationary rail top edges 236. Because of this position-movement relationship, the objects 16 are lifted proximately ¼ inch from the stationary rails 230 and carried forward proximately 3¼ inches by the movable rails 210 whereupon the objects 16 again reengage with the stationary support rails 230. The objects 16 then remain on the stationary rails 230 until the drive plate assembly 98 completes the rearward portion of the cycle and forward movement again occurs.

The objects 16, as described above, thus are stepped forward from the entrance 12 toward the exit 14 where a series of holding stations 250 may be provided. The actual number of stations 250 incorporated depends on the anticipated differences between the rate of object input into the conveyor 10 and the demand for the objects 16 at the exit 14. The number of stations 250 should be sufficient to provide storage for the difference.

Assuming that all of the holding stations 250 are empty, a first object, which may be conveniently designated 16a, is stepped forward to first engage the holding cam 264b. Reference to the various structural features of the cam 264 will also carry the suffix "b". If the cam 264b is rotated fully clockwise, an outer surface 278a of the object 16a strikes the rear inner end wall portion 276b of the cam 264b. Because of the angle of attack between the object outer surface 278a and the inner end wall portion 276b, the object 16a forces the cam 264b to rotate fully counterclockwise as the object 16a moves forward. The rear stop portion 272b of the cam 264b thus engages the stop plate 260. As the object 16a moves forward once again, the outer surface 278a of the object 16a strikes the forward inner sidewall portion 290b to rotate the cam 264b fully clockwise again. In this manner, the object 16a may proceed forward until it engages the stop 240.

As is seen in FIG. 16, when the object 16a engages with the stop 240, the holding cam 264a is rotated fully clockwise and may not rotate counterclockwise because of engagement between the object outer surface 278a and the forward inner sidewall portion 290a of the holding cam 264a.

Assume now that a further object designated 16b enters the conveyor 10 and is stepped forward to the holding stations 250. The object 16b may proceed forward and through the holding stations 250 as described above. However, this forward movement is halted by the holding cam 264a wherein an outer surface 278b of the object 16b engages the rear inner end wall portion 276a of the cam 264a. Note that when this engagement occurs, the object outer surface 278b also engages with the forward inner sidewall portion 290b of the cam 264b. Thus when a further object designated 16c moves into the holding stations 250, its forward movement is halted by the cam 264b which has been rotated fully clockwise and maintained as such by the object 16b. In this manner, as each successive holding station 250 may be occupied by an object 16.

Assume now that with the objects 16a-c in place as shown in FIG. 16, the object 16a is removed from the conveyor 10. With the removal of the object 16a, the object 16b may now move forward in that the cam 264a may be rotated counterclockwise by the outer surface 278b of the object 16b engaging the rear inner end wall portion 276a of the cam 264a. With the object 16b now moved forward, the object 16c may also move forward so that all the holding stations 250 may be refilled.

During the accumulation and storage of the objects 16 in the holding stations 250, the drive plate assembly 98 continues to lift the objects 16 from the stationary support rails 230. During this lifting and subsequent lowering, the vertical orientation of the objects 16 is maintained by individual engagement with a respective holding cam 264 and a guide plate 302 attached to the stationary support rail 230 opposite the rail 230 to which the support angle 252 is attached. The guide plate 302 and a vertical leg 304 define the sides 294 to the path of movement of the objects 16.

While various modifications may be suggested by those versed in the art, it should be understood that I wish to embody within the scope of the patent warranted hereon, all such modifications as reasonably and properly come within the scope of my contribution to the art.

What is claimed is:

1. A conveying device for moving objects between an entrance and an exit, said device comprising, a power distribution plenum defined by an outer and inner elongated channel member separated by a series of tube supports positioned transversely between said members, bearing means carried by said tube supports for journaling a centrally located primary input shaft and secondary drive shafts positioned on each side of said primary shaft, said secondary shafts operatively connected to said primary shaft to provide a synchronized rotation of all said shafts, a drive plenum carried by said conveying device adjacent to said power distribution plenum, said drive plenum defined by an elongated top and bottom channel cover affixed to said inner channel member, a series of vertical supports carried by said channel covers on a side opposite said inner channel member, said supports spaced periodically between said entrance and said exit, pairs of vertically spaced outer ball transfer means carried by said vertical supports to project into said drive plenum, pairs of inner vertically spaced ball transfer means positioned in openings formed in said inner channel member and carried by a plate affixed to said channel member, said inner ball transfer means projecting into said drive plenum and positioned in an opposing manner with respect to said outer ball transfer means, and a drive plate assembly carried between said inner and outer ball transfer means with said drive plate assembly having first wear surfaces attached to a drive plate for engagement with said ball transfer means so as to maintain said drive plate assembly movable in a vertical plane, reciprocating means including a horizontal cam assembly carried on an inner end of said primary input shaft, said shaft extending into said drive plenum with said cam assembly having an eccentrically offset cam bearing engaging second wear surfaces affixed on each side of an elongated vertical opening in said drive plate of said drive plate assembly, and vertical cam assemblies carried one each on an inner end of said said secondary drive shafts, said secondary shafts extending into said drive plenum with each said vertical cam assembly having an eccentrically offset cam bearing engaging respectively a third wear surface affixed along a top of a series of elongated horizontal openings in said drive plate, and conveying means comprising an elongated pair of spaced stationary rails carried by said drive plenum thereabove and extending from said entrance to said exit, and a pair of spaced movable rails carried adjacent to said stationary rails and operatively connected to said drive plate assembly, wherein rotation of said primary drive shaft causes a like rotation of said secondary drive shaft to engage said cam assemblies with said wear surfaces of said drive plate assembly so as to reciprocate said movable rails, said movable rails engaing a lower surface of said object likewise carried by said stationary rails, said movable rails intermittently lifting and carrying said objects toward said conveyor exit.

* * * * *